Figure 1:
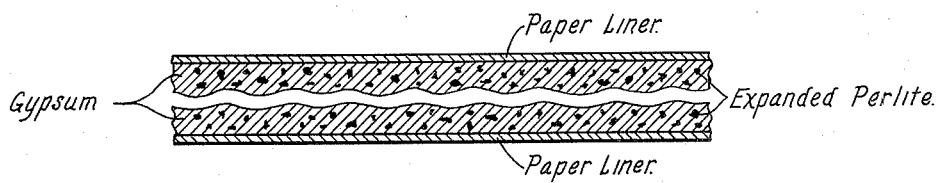

Aug. 20, 1957   W. C. RIDDELL ET AL   2,803,575
GYPSUM BOARD
Filed Aug. 17, 1953

INVENTORS
Wallace C. Riddell
BY  George B. Kirk.
James E. Toomey
atty.

United States Patent Office 2,803,575
Patented Aug. 20, 1957

2,803,575
GYPSUM BOARD

Wallace C. Riddell, Berkeley, and George B. Kirk, Redwood City, Calif., assignors to Kaiser Gypsum Company, Inc., Oakland, Calif., a corporation of Washington Application August 17, 1953, Serial No. 374,832

9 Claims. (Cl. 154—88)

This invention relates to wallboards for building construction and to a method for preparing the same; and more particularly it relates to lightweight gypsum core construction materials such as board, lath, or sheathing, and to a method for preparing the same.

Gypsum core boards, including lath and sheathing, have been employed in building construction for a long time. In general, these boards comprise essentially a core of set, interlaced gypsum crystals disposed between fibrous, especially paper, liners. It has long been known to incorporate certain addition agents in the core, however. These have included, for example, foam aggregate wherein a foam has been separately prepared and then incorporated in the gypsum slurry prior to forming and setting thereof, an adhesive such as starch or dextrin, organic or other fibers, and other addition agents known in this art.

The gypsum core boards are quite heavy, weighing as much as three thousand pounds per thousand square feet when of one-half inch thickness where no weight-reducing addition agent is employed. As indicated above, it has already been known to add previously prepared foam aggregate in one method of weight reduction. In others, voids or air cells are provided in the core by adding chemicals which react within the plastic slurry to form gases dispersed thru the slurry, for instance carbonates are added to yield $CO_2$ with a suitable reactant; or, an air-entraining agent may be employed to enable whipping air into the mix during formation of the plastic slurry. However, the amount of air or gas cells, or voids, which can be incorporated is limited, because the strength of the board is correspondingly reduced as the amount of air cells increases. Likewise, the ability of the board to be nailed during construction, and to hold nails firmly, is deleteriously affected by excessive amounts of air cells or voids; and the fire resistance of the gypsum board is reduced, also.

It is an object of this invention to provide a strong, gypsum-core board, such as wallboard, lath or sheathing, of lighter weight than has been previously known or than could be made by any of the previously known methods. It is a further object to provide such a lightweight board which is excellently adapted to receive and to hold nails tightly. It is a still further object to provide such a lightweight board which is flexible and strong. Another object is to produce lightweight board of superior fire resistance qualities.

According to the present invention, a strong, a lightweight gypsum product is produced by preparing a plastic slurry of calcined gypsum in water and uniformly incorporating therein from 0.5% to 10%, preferably from 1% to 3% of expanded perlite, then forming and drying the object. Where it is desired to form a gypsum core board, the slurry mixture so produced is deposited between fibrous liners, dried and hardened. Means for and the methods for forming gypsum core boards are in themselves known to the art and it suffices to say that the boards are formed in the known way, therefore, for instance, on a commercial board-forming machine. The finished board has a core weight of less than 1900 pounds per 1000 square feet, when of one-half inch thickness, and is of good strength.

The calcined gypsum slurry is prepared by admixing calcined gypsum, that is, calcium sulfate hemihydrate, with water and this procedure is well known in this art. The calcium sulfate hemihydrate is ordinarily prepared, substantially as needed, by calcining gypsum, $$CaSO_4 \cdot 2H_2O$$

to remove the desired amount of water of crystallization; and the freshly calcined gypsum, in the preferred commercial practice, is conducted to a mixer where the plastic slurry thereof is formed.

The expanded perlite employed in this process is prepared by heating perlite, a siliceous volcanic glass having an appreciable amount (normally from 2% to 5%) of occluded water, under such conditions as to cause the water to expand suddenly and to be driven off quickly, whereby the perlite remaining contains a large number of voids, i. e. is preferably vesiculated, and is substantially reduced in weight. Methods for producing the desired expanded perlite and means for carrying out these methods have been described in the literature and in patents. Any desired method or apparatus can be employed in preparing the expanded perlite, so long as the perlite puffs and vesiculates upon heating and forms a product of the desired characteristics, especially as defined below, preferably containing sealed voids. The expanded perlite useful in this invention has a bulk density of from 5 to 15 pounds per cubic foot, preferably of from 6 to 8 pounds per cubic foot. It is employed, as stated, in an amount of from 0.5% to 10% by weight, preferably 1% to 3%, calculated on the total dry weight of the core. Where the higher amounts by weight are employed, expanded perlite of higher bulk density is used, so that the volume of this aggregate which is added is adequate. Conversely, where expanded perlite of lower bulk density is added, lesser amounts by weight are used, within the range stated. The expanded perlite used herein is employed in a particle size substantially entirely, i. e. at least 85%, passing a No. 8 screen and substantially entirely, i. e. at least 85%, retained on a No. 100 screen. A typical batch of perlite aggregate useful in this invention can have the following particle size distribution: 5% retained on No. 8 screen, 40% retained on No. 16 screen, 75% retained on No. 30 screen, 95% retained on No. 50 screen and 100% retained on No. 100 screen. This particle size distribution can vary, however, within the broader limits set forth above.

There is also incorporated in the calcined gypsum slurry an agent to provide air cells or voids in the finished product. A foam aggregate can be employed. Preferably, there is added as an air-entraining agent a small amount of a water-soluble salt of Vinsol resin, such as an alkali metal salt thereof. This resin is derived from wood, is a brittle solid at normal or room temperature and is thermoplastic. The resin is the petroleum hydrocarbon-insoluble fraction of the coal-tar extract of pine wood. A typical analysis of one such resin, useful as an air-entraining agent in the process of this invention, shows a softening point of about 116° C. (drop method), a saponification number of about 135, a methoxy content of about 5%, gasoline solubility of about 16%, and petroleum ether insolubility of about 98%. The exact chemical composition of this resin is believed not known. The air-entraining agent is preferably added in an amount of from 1 to 4 pounds per 1000 square feet of board, or in an amount of from 0.05% to 0.2% based on the total dry core weight. It is preferably added to the slurry in the mixer at the time the water is added. The resin is employed as the water-soluble salt of the resin and is added as a solution in water, of approximately 3% to 20% concentration. During the addition of the air-entraining agent and during the mixing of the slurry, the whole is vigorously agitated, in order to entrain or incorporate air cells or bubbles therein and to form minute air cells in situ. Upon subsequent drying of the plastic slurry, voids or small air cells or pockets remain in the set gypsum core.

Other addition agents, some of which are commonly employed in this art, can also be employed in the calcined gypsum slurry of the present invention. There is suitably added for instance a small amount of ceramic fibers, such as glass, or organic fibers such as wood fiber or paper or sawdust. Preferably, from 0.2% to 2.0% of such fibers are added. It is preferable also to add a small amount of a farinaceous adhesive, such as starch or dextrin, in order to ensure that the fibrous or paper liners will not peel off the finished board—usually about 0.25% to 0.75% of such adhesive is added according to good common practice in this art. A small amount, e. g. from 0.05% to .20%, of a dispersing agent such as waste sulfite liquor or dried waste sulfite liquor can also be added. When a calcined gypsum slurry is referred to herein, it is to be understood that fibers, adhesive, and dispersing agent additives are included as desired, in the manner described.

In preparing the gypsum product of this invention, calcined gypsum is preferably admixed in the dry state with the expanded perlite, and with the other dry addition agents mentioned above. The whole is then introduced into a mixing device, preferably a pin mixer such as the Ehrsam mixer, and there is also introduced into this mixer the usual amount of water to make a plastic slurry. At the same time there is fed into the mixer the air-entraining agent as described above, as water solution, and waste sulfite liquor if the latter is employed. If desired, however, the water-soluble material can be admixed with the mixing water prior to introduction thereof into the mixing device. The slurry is vigorously beaten or agitated whereby air is drawn into and incorporated in the mix, ultimately providing voids or air cells in the dried mass. The plastic slurry is then for example, fed between paper liners in a commercial board-forming machine, and is then dried and hardened. Alternatively, the calcined gypsum, expanded perlite, and other dry addition agents can be fed separately into the mixing device and mixed therein, but, as stated, it is preferred to intermix all the dry ingredients prior to introduction into the mixing device. The formed board is allowed to set, is cut into desired lengths and then dried at a temperature of not over about 400° F.

Figure 2:
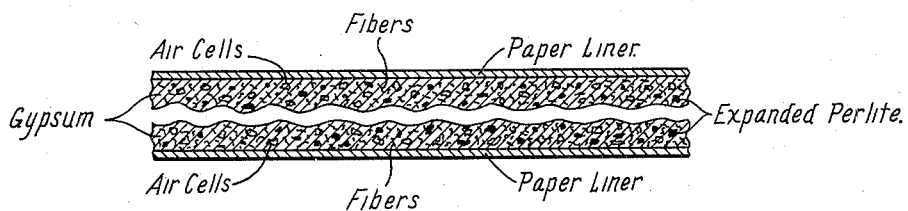

In the annexed drawings, Fig. 1 is a cross-sectional view of one embodiment of this invention, that is, of a board made within the scope of the present invention, showing paper liners and the core consisting principally of set gypsum with expanded perlite dispersed therethrough; and Fig. 2 is a cross-sectional view of a board which is another specific embodiment of the present invention, showing the paper liners and the core consisting principally of set gypsum and having dispersed therethrough expanded perlite particles (shaded for contrast), voids or air cells, and fibers, all as indicated by the legends on the figures.

It is an advantage of the present invention that the final board, lath, sheathing or the like is light in weight, weighing from 1600 to 1900, now preferably 1800 to 1850, pounds per thousand square feet of one-half inch board and is therefore easier for the workmen to handle and hang. It is a further advantage, however, that although light, the board is of adequate strength and meets the A. S. T. M., U. S. Government, American Standards Association, and other building codes requirements for flexural strength. It has been a quite unexpected advantage that the board is so flexible and resilient that it can be tightly nailed to slightly out-of-line framing, and will accommodate itself to irregularities in frame structure, without developing fractures or cracks. This is advantageous not only in new construction where some framing irregularities may occur but also in repairs or remodeling of older structures where settling or warping may have occurred. It is a further advantage that board made according to the present invention can be cut easily and that an especially smooth cut edge is thereby produced, exhibiting a good, even surface, which is particularly desirable in making apertures for electrical or other outlets. It is especially advantageous that the board's flexibility enables harder blows in nailing, resulting in firmer nailing and less popping out of nails, than boards of the prior art. In the boards of the present invention, fracture of the core or breakage of the paper liner under heavy nailing blows is greatly reduced or is eliminated. When expanded perlite is added in the amounts shown herein, the resulting board has a strong and stable core. It is also advantageous that the board so prepared has increased fire resistance, as shown by the following tests. Board made according to this invention has been tested in a wall partition fire test according to A. S. T. M. E119–50, wherein 2" x 4" load-bearing wood studs are faced on both sides with this board, and was rated 42 minutes, in comparison with a rating of 40 minutes for conventional one-half inch board of heavier weight. This represents a 5% increase in fire resistance despite the decreased weight. Other lightweight gypsum core boards, made with air-entraining agent but without the addition of expanded perlite, and weighing between 1800 and 1900 pounds per 1000 square feet (one-half inch thick), were tested in the same way according to A. S. T. M. E119–50 and were rated 35 to 38 minutes.

The following examples will more clearly demonstrate the mode of carrying out this invention, and the product obtained thereby.

*Example*

A stream of dry calcined gypsum, calcium sulfate hemihydrate, is continuously mixed with expanded perlite weighing about 7.5 pounds per cubic foot and of such particle size that 5% is retained on a No. 8 screen, 40% is retained on a No. 16 screen, 75% is retained on a No. 30 screen, 95% is retained on a No. 50 screen and 100% is retained on No. 100 screen. There are also mixed with the stream of dry calcined gypsum, sawdust, starch and a retarder. The dry mixture is then introduced into a pin type mixer (Ehrsam mixer, in this example) where water is continuously added to form a plastic slurry in the known way, and sodium salt of Vinsol resin dissolved in water is simultaneously introduced, and the whole is vigorously agitated or beaten to incorporate air bubbles in the mix. The components above are added in the following relative amounts, calculated on 1000 square feet of finished board, of one-half inch thickness.

|  | Pounds |
|---|---|
| Calcined gypsum | 1330 |
| Expanded perlite | 30 |
| Sawdust | 45 |
| Vinsol resin salt (5% solution) | 4 |
| Starch | 7 |
| Commercial retarder | 0.3 |

The slurry, after thorough agitation, is then deposited between paper liners in a board-forming machine and is dried suitably at a temperature of from about 360° F. at the entrance to the drying zone to about 200° F. at the exit therefrom, and hardened. The set and dried composition contains 223 pounds combined water, and the paper liners weigh 160 pounds, both on the basis of 1000 square feet. The final board, one-half inch in thickness, weighs 1800 pounds per 1000 square feet. It has a flexural strength parallel to the liner fibers of 141 pounds and across the fibers of 50 pounds.

In another series of runs, the composition is made up exactly the same way as in this example and is formed into board as there described, except that there are employed 1200 pounds of calcined gypsum and 72 pounds of expanded perlite weighing 12 pounds per cubic foot and of particle size as follows: 0.4% retained on No. 8 screen, 14% retained on No. 16 screen, 72% retained on No. 30 screen, 88.0% retained on No. 50 screen and 96.0% retained on No. 100 screen. The resultant half-inch board weighs 1700 pounds per 1000 square feet and has a flexural strength parallel to the liner fibers of 140 pounds and across the fibers of 50 pounds. In a further series, the composition and board are prepared in the same way except that there are employed 1100 pounds of calcined gypsum and 96 pounds of the 12 pound expanded perlite described immediately above. The resultant half-inch board weighs 1600 lbs. per 1000 square feet and has a flexural strength parallel to the liner fibers of 155 pounds and across the fibers of 60 pounds. It can be seen that these boards are of very light weight and yet have excellent strengths.

In typical runs it has been found that an average core density for excellent examples of each of several different half-inch boards is as follows: about 46 pounds per cubic foot for 1900 pound board; about 44.5 pounds per cubic foot for 1850 pound board; about 43 pounds per cubic foot for 1800 pound board; about 40.5 pounds per cubic foot for 1700 pound board; and about 38 pounds per cubic foot for 1600 pound board. These values, as stated, refer to the density of the gypsum core and are without reference to the paper liners. It can be said that a strong gypsum core board is made according to the invention, which has a core density of not over 46 pounds per cubic foot, or which is preferably from about 38 to about 46 pounds per cubic foot.

In the above examples, ceramic fibers can be used instead of or in addition, in a small amount, to the organic fibers shown.

In the present specification and in the claims annexed, percentages are percent by weight unless otherwise indicated, and they are based on the total dry weight of the finished, set core. The screen sizes or numbers shown are U. S. Standards screens as described in Handbook of Chemistry and Physics, 32nd edition, 1950-51, page 2797, published by the Chemical Rubber Publishing Company. The commercial retarder used herein can suitably be keratin which has been at least partially hydrolyzed, but any other retarder, or, conversely, an accelerator, can be employed, as desired and in accordance with the usual good practice in this art.

The invention has been described above with particular reference to the manufacture of wallboard, but it will be understood that it can be employed also in making lath, sheathing or other products. Also, although the above description has been given with reference to half-inch board, it will be understood that boards of other thicknesses can also be made according to the invention and with corresponding savings in weight. For example, board of three-eighths or five-eighths inch thickness can be so made. The above specific description and examples have been given for purposes of illustration only, and modifications and variations can be made therein without departing from the spirit and scope of the appended claims.

Having now described the invention, what is claimed is:

1. In a wallboard characterized by increased flexibility and a weight of from 1600 to 1900 pounds per thousand square feet at one-half inch thickness, a core consisting essentially of set interlaced gypsum crystals and having uniformly dispersed in said core, from 0.5% to 10% by weight of expanded vesiculated perlite having a bulk density of from 5 to 15 pounds per cubic foot and of particle size substantially entirely passing a No. 8 screen and retained on a No. 100 screen.

2. A wallboard characterized by increased flexibility and a lightweight of from 1600 to 1900 pounds per thousand square feet at one-half inch thickness, comprising a core consisting essentially of set interlaced gypsum crystals, said core being disposed between paper liners, foam-produced air cells distributed through said core, from 0.2% to 2% by weight of fibers, and from 0.5% to 10% by weight of expanded vesiculated perlite having a bulk density not exceeding about 15 pounds per cubic foot and of particle size substantially entirely passing a No. 8 screen and retained on a No. 100 screen.

3. Wallboard as in claim 2 wherein said expanded perlite is added in an amount of from 1% to 3% by weight.

4. Wallboard as in claim 2 containing also from 0.25 to 0.75% by weight of a farinaceous adhesive agent.

5. A wallboard as in claim 2 wherein said expanded perlite has a bulk density of from 6 to 8 pounds per cubic foot.

6. A method of preparing a lightweight flexible wallboard weighing from 1600 to 1900 pounds per thousand square feet at one-half inch thickness, which comprises preparing an admixture of calcined gypsum and from 0.5% to 10% by weight of expanded vesiculated perlite having a bulk density of from 5 to 15 pounds per cubic foot and of particle size substantially entirely passing a No. 8 screen and retained on a No. 100 screen, admixing with water to form a plastic slurry, depositing said slurry between fibrous liners and forming into a board and drying and hardening at a temperature of not over about 400° F.

7. Method as in claim 6 wherein said board is dried at a temperature of from 360° to 210° F.

8. Method as in claim 6 wherein there is admixed from 1% to 3% by weight of expanded perlite having a bulk density of from 6 to 8 pounds per cubic foot.

9. Method of preparing lightweight wallboard of improved nailability and weighing from 1800 to 1850 pounds per thousand square feet at one-half inch thickness, which comprises preparing an admixture of calcined gypsum, from 0.5% to 10% by weight expanded vesiculated perlite having a density of from 6 to 8 pounds per cubic foot and of particle size substantially entirely passing No. 8 mesh and retained on No. 100 mesh, from 0.2% to 2.0% by weight organic fibers and from 0.25% to 0.75% by weight farinaceous adhesive material, introducing said admixture into a slurrying zone, adding to said admixture in said zone water and a water solution containing from 0.05 to 0.2% by weight, based on the total dry weight of the mix, of an alkali salt of Vinsol resin to form a plastic slurry, vigorously agitating said plastic slurry to incorporate air cells therein, depositing said slurry containing air cells between paper liners and drying and hardening at a temperature of not over about 400° F.

References Cited in the file of this patent

UNITED STATES PATENTS

| | | |
|---|---|---|
| 1,778,008 | Delaney | Oct. 14, 1930 |
| 2,083,961 | New | June 15, 1937 |
| 2,207,339 | Camp | July 9, 1940 |
| 2,501,698 | Stecker | Mar. 28, 1950 |
| 2,526,066 | Croce | Oct. 17, 1950 |
| 2,580,076 | Deane | Dec. 25, 1951 |
| 2,585,366 | Bollaert et al. | Feb. 12, 1952 |

OTHER REFERENCES

Zoradi application 664,682. Abstract published January 16, 1951.